United States Patent
Louie et al.

(10) Patent No.: US 12,517,564 B2
(45) Date of Patent: Jan. 6, 2026

(54) BANDWIDTH COOLING DEVICE FOR MEMORY ON A SHARED POWER RAIL

(71) Applicant: QUALCOMM Incorporated, San Diego, CA (US)

(72) Inventors: Louis Louie, San Diego, CA (US); Ronald Alton, Oceanside, CA (US); Srikar Karnam Venkat Naga, Banagalore (IN); Sean Sweeney, Firestone, CO (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 18/335,037

(22) Filed: Jun. 14, 2023

(65) Prior Publication Data
US 2024/0419232 A1   Dec. 19, 2024

(51) Int. Cl.
| | | |
|---|---|---|
| G06F 1/28 | (2006.01) | |
| G06F 1/18 | (2006.01) | |
| G06F 1/20 | (2006.01) | |
| G06F 1/26 | (2006.01) | |
| G06F 1/30 | (2006.01) | |
| G06F 1/3203 | (2019.01) | |
| G06F 1/3225 | (2019.01) | |
| G06F 1/3234 | (2019.01) | |

(52) U.S. Cl.
CPC ............... *G06F 1/28* (2013.01); *G06F 1/189* (2013.01); *G06F 1/206* (2013.01); *G06F 1/26* (2013.01); *G06F 1/305* (2013.01); *G06F 1/3203* (2013.01); *G06F 1/3225* (2013.01); *G06F 1/3275* (2013.01)

(58) Field of Classification Search
CPC .......... G06F 1/3203; G06F 1/26; G06F 1/206; G06F 1/28; G06F 1/3275; G06F 1/189; G06F 1/3225; G06F 1/305
USPC .............................................. 713/300; 710/60
See application file for complete search history.

(56) References Cited

U.S. PATENT DOCUMENTS

| | | | | |
|---|---|---|---|---|
| 7,064,994 B1 * | 6/2006 | Wu | ......................... | G06F 1/206 |
| | | | | 702/132 |
| 2008/0091962 A1 * | 4/2008 | Cepulis | ................. | G06F 1/3203 |
| | | | | 713/320 |
| 2013/0009687 A1 * | 1/2013 | Matsuyama | ............ | G06F 1/324 |
| | | | | 327/299 |
| 2013/0151869 A1 | 6/2013 | Steinman et al. | | |
| 2013/0346670 A1 * | 12/2013 | Wang | ...................... | G06F 1/305 |
| | | | | 711/E12.008 |
| 2015/0185797 A1 * | 7/2015 | Cooper | ................. | G06F 1/3275 |
| | | | | 713/340 |

(Continued)

FOREIGN PATENT DOCUMENTS

WO      2022272213 A1   12/2022

OTHER PUBLICATIONS

International Search Report and Written Opinion—PCT/US2024/026873—ISA/EPO—Aug. 9, 2024.

*Primary Examiner* — Ji H Bae
(74) *Attorney, Agent, or Firm* — Seyfarth Shaw LLP (57) ABSTRACT

A method for device cooling includes determining whether an amount of power allocated to devices drawing power from a shared power rail exceeds a power rail limit. The method also includes reducing device traffic to a specified bandwidth level for at least one of the devices in response to the amount of power allocated to the devices drawing power from the shared power rail exceeding the power rail limit.

24 Claims, 8 Drawing Sheets

(56) References Cited

U.S. PATENT DOCUMENTS

| | | | |
|---|---|---|---|
| 2019/0171277 A1* | 6/2019 | Satou | G06F 1/3206 |
| 2019/0370929 A1* | 12/2019 | Imbrogno | G06F 12/0891 |
| 2021/0149476 A1* | 5/2021 | Alton | G06F 1/329 |
| 2021/0201986 A1* | 7/2021 | Brandl | G11C 11/40615 |
| 2023/0144770 A1* | 5/2023 | Chapman | G06F 1/206 |
| | | | 713/340 |

* cited by examiner

| Mitigation Level | | Power (mW) |
|---|---|---|
| | Unmitigated | 7150 |
| 1 | Power reduced by MXC rail | 750 |
| 2 | Power reduced by MXC rail | 1500 |
| 3 | Power reduced by MXC rail | 2000 |

BANDWIDTH COOLING DEVICE FOR MEMORY ON A SHARED POWER RAIL

BACKGROUND

Field

Aspects of the present disclosure relate to computing devices, and more specifically to a bandwidth cooling device for managing peak current of memory devices on a shared power rail.

Background

Mobile or portable computing devices include mobile phones, laptop, palmtop and tablet computers, portable digital assistants (PDAs), portable game consoles, and other portable electronic devices. Mobile computing devices are comprised of many electrical components that consume power and generate heat. The components (or compute devices) may include system-on-chip (SoC) devices, network-on-chip (NoC) devices, graphics processing unit (GPU) devices, neural processing unit (NPU) devices, digital signal processors (DSPs), and modems, among others.

New high performance SoC specifications are associated with higher memories and increased current consumption. High speed dynamic random access memory (DRAM), such as double data rate (DDR) subsystems, consumes a significant amount of current. These DDR subsystems may draw power from a shared power rail, such as a memory power (Mx) rail. With the large number of devices drawing power from the same memory power rail in SoCs or NoCs, the amount of power needed by all of the devices may exceed the current rating of the power rail. Memory current sizing is often fixed, e.g., as single phase 5 A current. It is not cost effective to add more phases to address this problem. Therefore, it would be desirable to introduce a bandwidth cooling device to manage memory peak current without throttling the memory itself.

SUMMARY

In aspects of the present disclosure, a method for device cooling includes determining whether an amount of power allocated to devices drawing power from a shared power rail exceeds a power rail limit. The method also includes reducing device traffic to a specified bandwidth level for at least one of the devices in response to the amount of power allocated to the devices drawing power from the shared power rail exceeding the power rail limit.

Other aspects of the present disclosure are directed to an apparatus. The apparatus has a memory and one or more processors coupled to the memory. The processor(s) is configured to determine whether an amount of power allocated to devices drawing power from a shared power rail exceeds a power rail limit. The processor(s) is also configured to reduce device traffic to a specified bandwidth level for at least one of the devices in response to the amount of power allocated to the devices drawing power from the shared power rail exceeding the power rail limit.

Other aspects of the present disclosure are directed to an apparatus. The apparatus includes means for determining whether an amount of power allocated to devices drawing power from a shared power rail exceeds a power rail limit. The apparatus also includes means for reducing device traffic to a specified bandwidth level for at least one of the devices in response to the amount of power allocated to the devices drawing power from the shared power rail exceeding the power rail limit.

In other aspects of the present disclosure, a non-transitory computer-readable medium with program code recorded thereon is disclosed. The program code is executed by a processor and includes program code to determine whether an amount of power allocated to devices drawing power from a shared power rail exceeds a power rail limit. The program code also includes program code to reduce device traffic to a specified bandwidth level for at least one of the devices in response to the amount of power allocated to the devices drawing power from the shared power rail exceeding the power rail limit.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described, the use of the term "and/or" is intended to represent an "inclusive OR," and the use of the term "or" is intended to represent an "exclusive OR." As described, the term "exemplary" used throughout this description means "serving as an example, instance, or illustration," and should not necessarily be construed as preferred or advantageous over other exemplary configurations. As described, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described, the term "proximate" used throughout this description means "adjacent, very near, next to, or close to." As described, the term "on" used throughout this description means "directly on" in some configurations, and "indirectly on" in other configurations.

New high performance system-on-chip (SoC) specifications are associated with higher memories and increased current consumption. High speed dynamic random access memory (DRAM), such as double data rate (DDR) subsystems, consumes a significant amount of current. These DDR subsystems may draw power from a shared power rail, such as a memory power rail (Mx). With the large number of devices drawing power from the same memory power rail in SoCs or network-on-chips (NoCs), the amount of power needed by all of the devices may exceed the current rating (e.g., 5 A) of the power rail. Moreover, throttling the core clock to a lowest clock frequency may not be sufficient to reduce the overall DDR load enough to bring down the memory power rail current consumption to an acceptable level. Therefore, it would be desirable to introduce a bandwidth cooling device (e.g., mitigation devices or knobs) to manage memory peak current without throttling the memory itself.

According to aspects of the present disclosure, peak current consumption of memory (e.g., DDR subsystems) is managed. Traffic generated towards the DDR subsystem and internal memories drives the peak current. As a result, a bandwidth cooling device may manage the traffic bandwidth generated from these sources without directly throttling the DDR subsystems. In some aspects, the traffic sources are non-real time clients, such as a central processing unit (CPU), graphics processing unit (GPU), and neural signal process core (NSP).

In order to reduce the bandwidth, bandwidth limiter registers may be added at entry points to the DDR front end. Bandwidth limiter registers may be written to by software drivers in order to implement the traffic management. More specifically, a concurrency use case may be monitored, such that multiple core devices are drawing power from a power rail, such as an Mx rail. A shared rail manager may then aggregate memory peak current based on a bandwidth request. The shared rail manager determines whether the power rail allocation exceeds a power rail limit. If the memory power exceeds the power rail limit, a policy engine hardware block generates an interrupt to a high level operating system (HLOS), such as a thermal manager. A policy engine driver calls into a thermal framework to invoke a cooling device, for example, by determining a bandwidth mitigation level as well as the victim device, in order to fit within a current limit for the buck regulator supplying the power rail. The bandwidth limiter registers may be written to in order to throttle bandwidth at the NoC entry points. For scenarios involving multiple best effort clients, throttling the core clock to a lowest level may not be sufficient to reduce the overall DDR load. In these cases, bandwidth limiting, in addition to core clock throttling, may be an efficient mitigation scheme. For example, register sets may be programmed with an absolute cap on DDR bandwidth from the GPU.

Particular aspects of the subject matter described in this disclosure can be implemented to realize one or more of the following potential advantages. In some examples, the described techniques, such as reducing device traffic to a specified bandwidth level improves cooling of core devices. Other advantages include managing peak current on a memory rail so the current does not 'brown out' the rail, and the ability to assign priority levels and different mitigation step sizes to mitigate different victims on a shared memory power rail.

Figure 1:
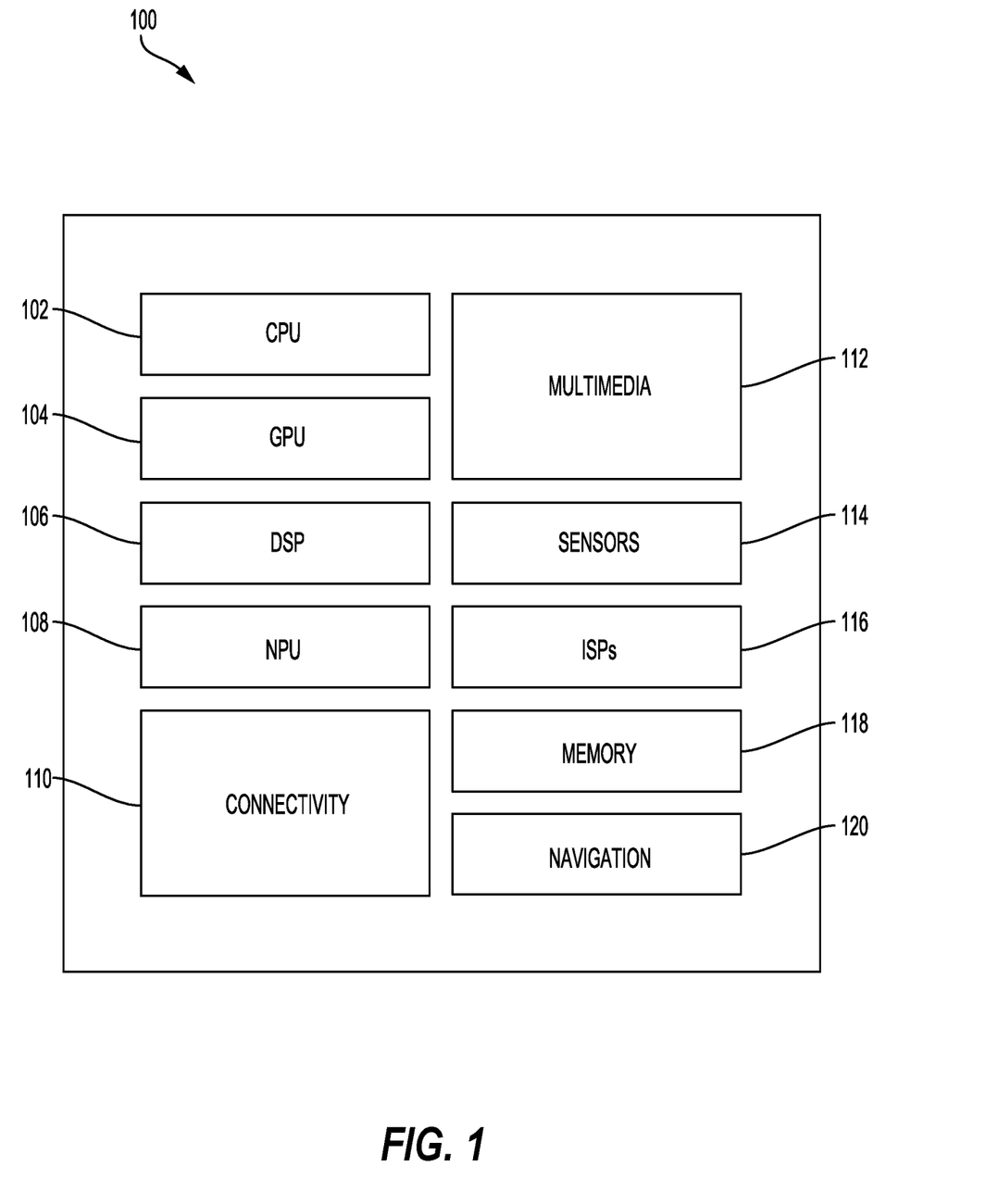
FIG. 1 illustrates an example implementation of a host system-on-chip (SoC), including a bandwidth cooling device, in accordance with certain aspects of the present disclosure.

FIG. 1 illustrates an example implementation of a host system-on-chip (SoC) 100, which includes a bandwidth cooling device, in accordance with aspects of the present disclosure. The host SoC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, universal serial bus (USB) connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU) 108. The host SoC 100 may also include a sensor processor 114, image signal processors (ISPs) 116, a navigation module 120, which may include a global positioning system (GPS), and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set.

According to aspects of the present disclosure, a device may include means for determining and means for reducing. In one configuration, the means for determining and means for reducing may be the CPU, GPU, DSP, NPU ISPs, multimedia block and/or memory, as shown in FIG. 1. In other aspects, the aforementioned means may be any structure or any material configured to perform the functions recited by the aforementioned means.

New high performance system-on-chip (SoC) specifications are associated with higher memories and increased current consumption. High speed dynamic random access memory (DRAM), such as double data rate (DDR) subsystems, consumes a significant amount of current. These DDR subsystems may draw power from a shared power rail, such as a memory power rail (Mx). With the large number of devices drawing power from the same memory power rail in SoCs or network-on-chips (NoCs), the amount of power needed by all of the devices may exceed the current rating (e.g., 5 A) of the power rail. Memory current sizing is often fixed, e.g., as single phase 5 A current. It is not cost effective to add more phases to address this problem. Moreover, throttling the core clock to a lowest clock frequency may not be sufficient to reduce the overall DDR load enough to bring down the memory power rail current consumption to an acceptable level. Therefore, it would be desirable to introduce a bandwidth cooling device (e.g., mitigation devices or knobs) to manage memory peak current without throttling the memory itself.

According to aspects of the present disclosure, peak current consumption of memory (e.g., DDR subsystems) is managed. Traffic generated towards the DDR subsystem and internal memories drives the peak current. As a result, a bandwidth cooling device may manage the traffic bandwidth generated from these sources without directly throttling the DDR subsystems. In some aspects, the traffic sources are non-real time clients, such as a central processing unit (CPU), graphics processing unit (GPU), and neural signal process core (NSP). Non-real time devices may be targeted to avoid system instability. In the following description, GPU traffic is reduced, but the mitigation device or knob may manage traffic from any source that sends traffic toward memory, such as the DDR subsystem.

In order to reduce the bandwidth, bandwidth limiter registers may be added at entry points to the DDR front end. These registers may be provided before the DDR controller for non-real time clients. Bandwidth limiter registers may be written to by software drivers in order to implement the traffic management. In an example implementation where GPU bandwidth is throttled, GPU bandwidth limiter registers include read/write registers named gem_noc_qnm_gpu0_qosgen_LimitBw_Low and gem_noc_qnm_gpu1_qosgen_LimitBw_Low, where each register operates on a different port from the GPU. The register value specifies at the hardware level a cap on an amount of traffic permitted for that particular port from the GPU.

A shared rail manager is a framework for monitoring peak current allocation and managing peak rail capacity on power rails from which devices draw current. In some implementations, a shared rail manager uses three inputs, voltage, temperature, and frequency, to manage peak rail capacity on a core logic power (Cx) rail and a memory power (Mx) rail. These inputs are processed based on look up tables (LUTs) and calculators to estimate and throttle victim devices on demand. The first input is voltage, which is received from an aggregated resource controller (ARC) in resource power manager hardware (RPMh). The second input is temperature, which is received from various temperature sensors distributed across the die. The third input is frequency, which is received from limits and clock software (SW) drivers. Look up tables contain dynamic and leakage power estimates for core operating points for summation based on active usage. The look up tables yield a maximum current for a present system state. The look up table data is obtained from process, voltage, temperature (PVT) analysis to estimate peak current from the system state.

The current may be managed by a programmable policy. For example, a policy engine block may trigger programmable victim cores to limit performance to remain within limits of an associated buck converter. The policy engine block provides mitigation through software interrupts to subsystems such as the CPU, modem, GPU, and neural signal processor (NSP)/NPU. The policy engine compares the look up table output to a rail limit and sends mitigation interrupts to software if the rail limit is exceeded. In this case, the policy engine triggers a reduction in core device operating levels, for example, with passive cooling, such as reducing current and/or clock frequency, and dropping component carriers, such as with a modem.

Figure 2:
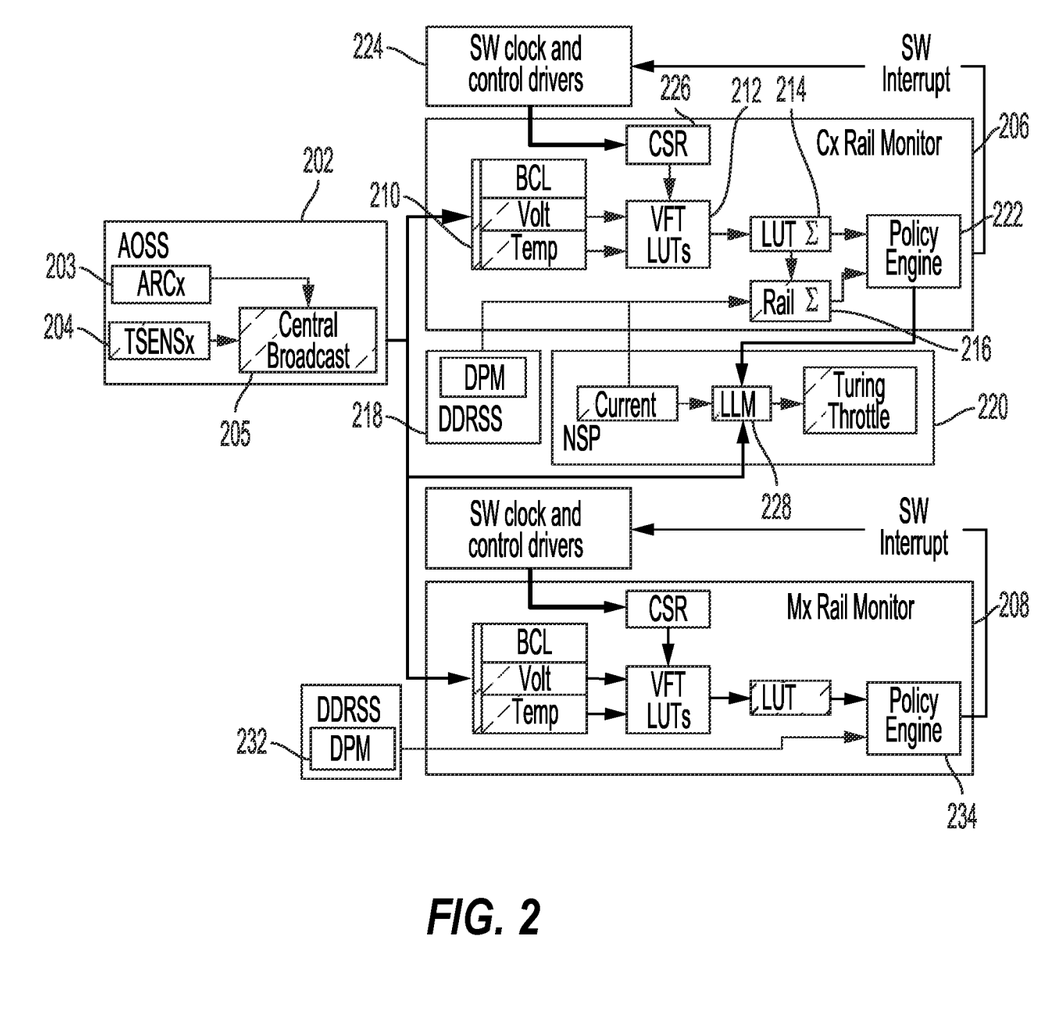
FIG. 2 is a block diagram illustrating a shared rail manager, in accordance with various aspects of the present disclosure.

FIG. 2 is a block diagram illustrating a shared rail manager, in accordance with various aspects of the present disclosure. An always on subsystem (AOSS) 202 provides temperature data from a number of temperature sensors (TSENSx) 204 and voltage data from a number of aggregated resource controllers (ARCx) 203 to a central broadcast block 205. The central broadcast block 205 provides this information to a core logic power (Cx) rail monitor 206 and a memory power (Mx) rail monitor 208. The Cx rail monitor 206 includes a block 210 that receives frequency information from a software clock driver, and also the voltage and temperature information from the central broadcast block 205. A set of voltage, frequency, temperature (VFT) look up table (LUTs) 212 receives the information as input. The VFT LUTs 212 may include a dynamic current LUT and a leakage current LUT. The LUT values are summed at a LUT summer 214. A rail summer 216 receives current information from a digital power meter (DPM) in a DDR subsystem (DDRSS) 218, as well as current information from an NSP 220.

A policy engine 222 acts as a comparator using the information received from the rail summer 216 and the LUT summer 214. If the look up table value exceeds the current value obtained from the rail summer 216, a software (SW) interrupt is generated and software clock and control drivers 224 write a value into a hardware control and status register (CSR) 226, such as the GPU bandwidth limit registers previously described. The policy engine 222 may also provide data to a local limits manager (LLM) 228 of the NSP 220, which may forward the information to a Turing throttle that operates as an artificial intelligence engine for hardware throttling of the NSP 220. The Mx rail monitor 208 operates in a similar manner as the Cx rail monitor 206, without a rail summer 216. Thus, a digital power meter (DPM) 232 associated with the Mx rail monitor 208 feeds information directly to the policy engine 234 of the Mx rail monitor 208.

Figure 3:
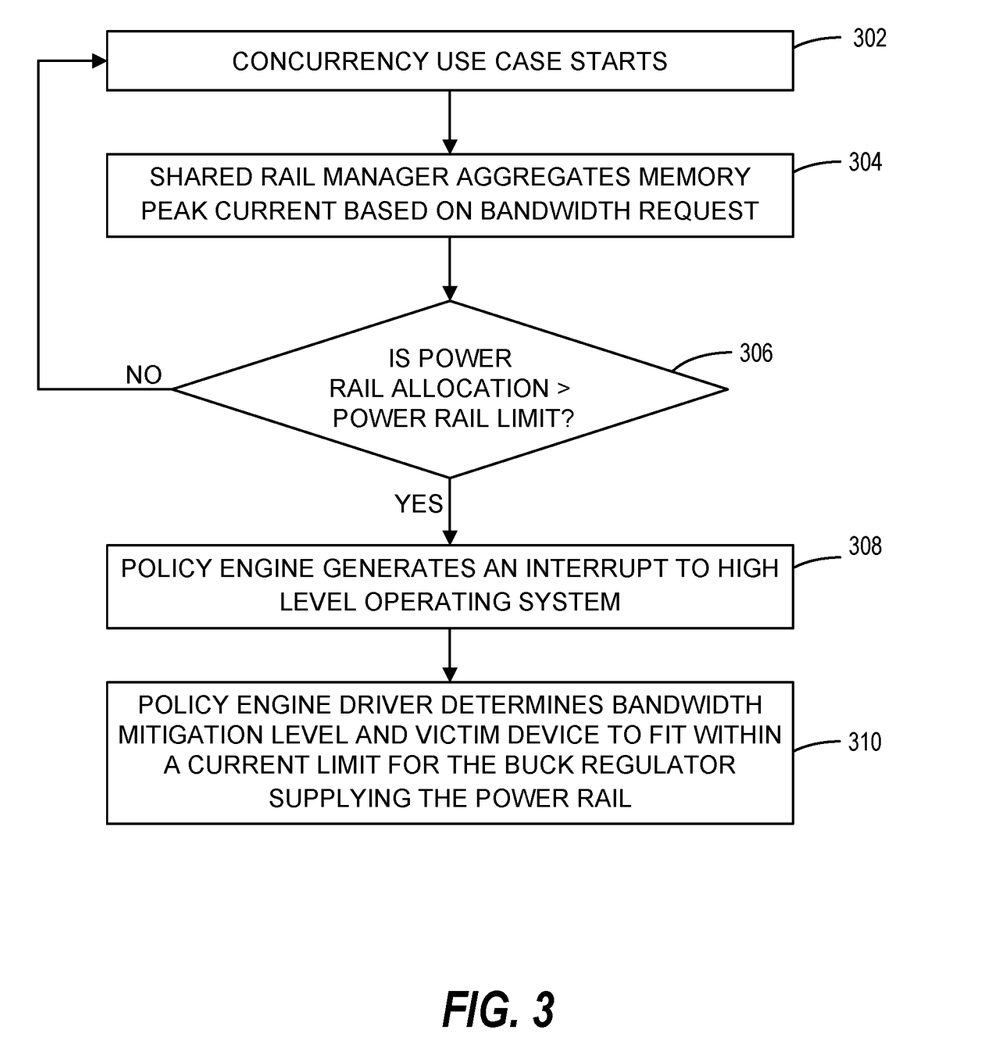
FIG. 3 is a flow diagram illustrating a process flow executed by a bandwidth cooling device, in accordance with various aspects of the present disclosure.

FIG. 3 is a flow diagram illustrating a process flow executed by a bandwidth cooling device, in accordance with various aspects of the present disclosure. At block 302, a concurrency use case starts, such that multiple core devices are drawing power from a power rail, such as an Mx rail. At block 304, a shared rail manager aggregates memory peak current based on a bandwidth request. At block 306, the shared rail manager determines whether the power rail allocation exceeds a power rail limit. If not, at block 302, the process repeats.

If the memory power exceeds the power rail limit, at block 308, the policy engine (PE) generates an interrupt to a high level operating system (HLOS), such as a thermal manager, which is described in more detail below. At block 310, the policy engine driver determines a bandwidth mitigation level as well as the victim device, in order to fit within a current limit for the buck regulator supplying the power rail. The bandwidth limiter registers may be written to in order to throttle bandwidth at the NoC entry points.

Bandwidth mitigation levels are now discussed. In this example, a GPU is considered as the victim device where the GPU operates, when unmitigated, with power rated at ~3200 mW. According to aspects of the present disclosure, when a memory power rail limit is reached, direct and indirect mitigation schemes may be implemented. Although a particular sequence and particular values are described, other mitigation levels and values are contemplated, each of which may be programmable.

Figure 4:
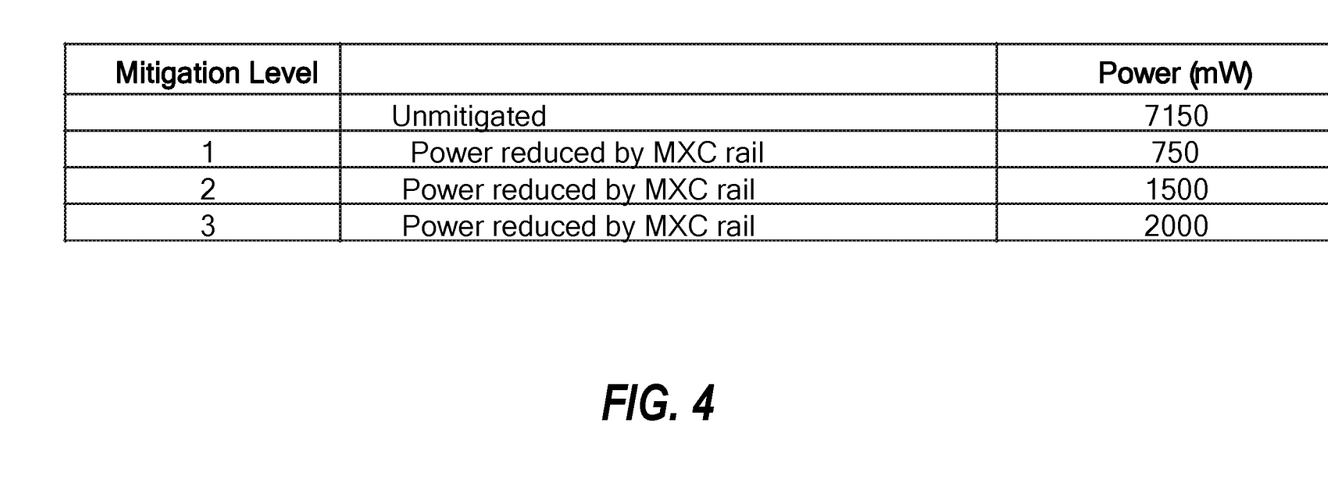
FIG. 4 is a table illustrating bandwidth reduction amounts for different mitigation levels, in accordance with various aspects of the present disclosure.

FIG. 4 is a table illustrating bandwidth reduction amounts for different mitigation levels, in accordance with various aspects of the present disclosure. In the example of FIG. 4, 7150 mW are consumed in an unmitigated scenario, which exceeds a power rail limit. For level 1 mitigation, GPU power reduction includes GPU bandwidth throttling to reduce bandwidth by 2 Gbps. Based on pre-silicon estimation and characterization, the corresponding power reduction is 750 mW. For level 2 mitigation, GPU power reduction includes GPU bandwidth throttling to reduce bandwidth by 4 Gbps. Based on pre-silicon estimation and characterization, the corresponding power reduction is 1500 mW. For more drastic action, level 3 mitigation for GPU power reduction includes GPU bandwidth throttling to reduce bandwidth by 6 Gbps. Based on pre-silicon estimation and characterization, the corresponding power reduction is 2000 mW.

Aspects of the present disclosure also address how to determine a bandwidth limiter threshold, in other words, how to map current reduction to bandwidth reduction. Computer modeling and computation may be employed to estimate a mapping between bandwidth and current.

Figure 5:
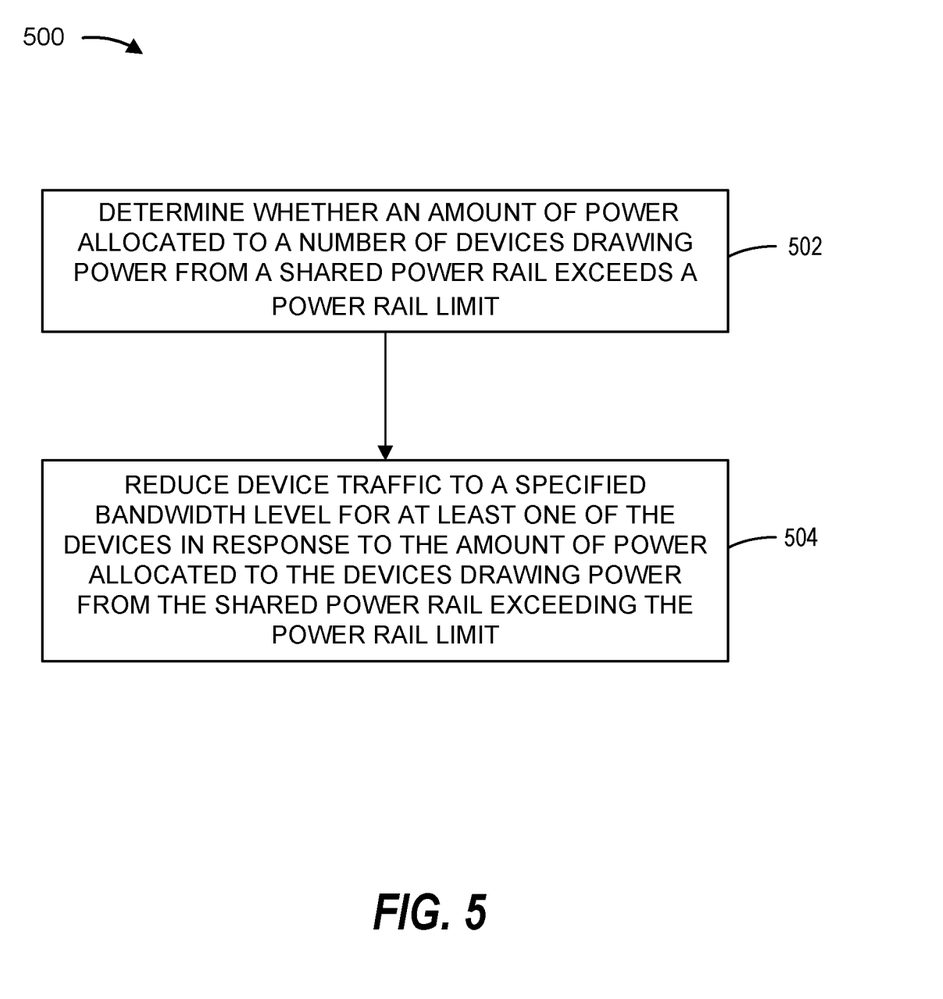
FIG. 5 is a flow diagram illustrating an example process for bandwidth cooling for managing peak current of memory devices on a shared power rail, in accordance with various aspects of the present disclosure.

FIG. 5 is a flow diagram illustrating an example process 500 for bandwidth cooling for managing peak current of memory devices on a shared power rail, in accordance with various aspects of the present disclosure. At block 502, a computer model and computation may determine whether an amount of power allocated to a number of devices drawing power from a shared power rail exceeds a power rail limit. In some aspects, one of the devices is a GPU. The amount of power may be based on an aggregated peak current for each of the plurality of devices At block 504, the model may reduce device traffic to a specified bandwidth level for at least one of the number of devices in response to the amount of power allocated to the number of devices drawing power from the shared power rail exceeding the power rail limit. In some aspects, the device traffic is traffic from at least one of the devices directed towards a memory device. The memory device may be a DDR memory device. In some aspects, the specified bandwidth level is one of a set of bandwidth levels, the specified bandwidth level selected based on how much the amount of power exceeds the power rail limit. Reducing the device traffic may include reducing current for the at least one of the devices by a quantity corresponding to the specified bandwidth level.

Figure 6:
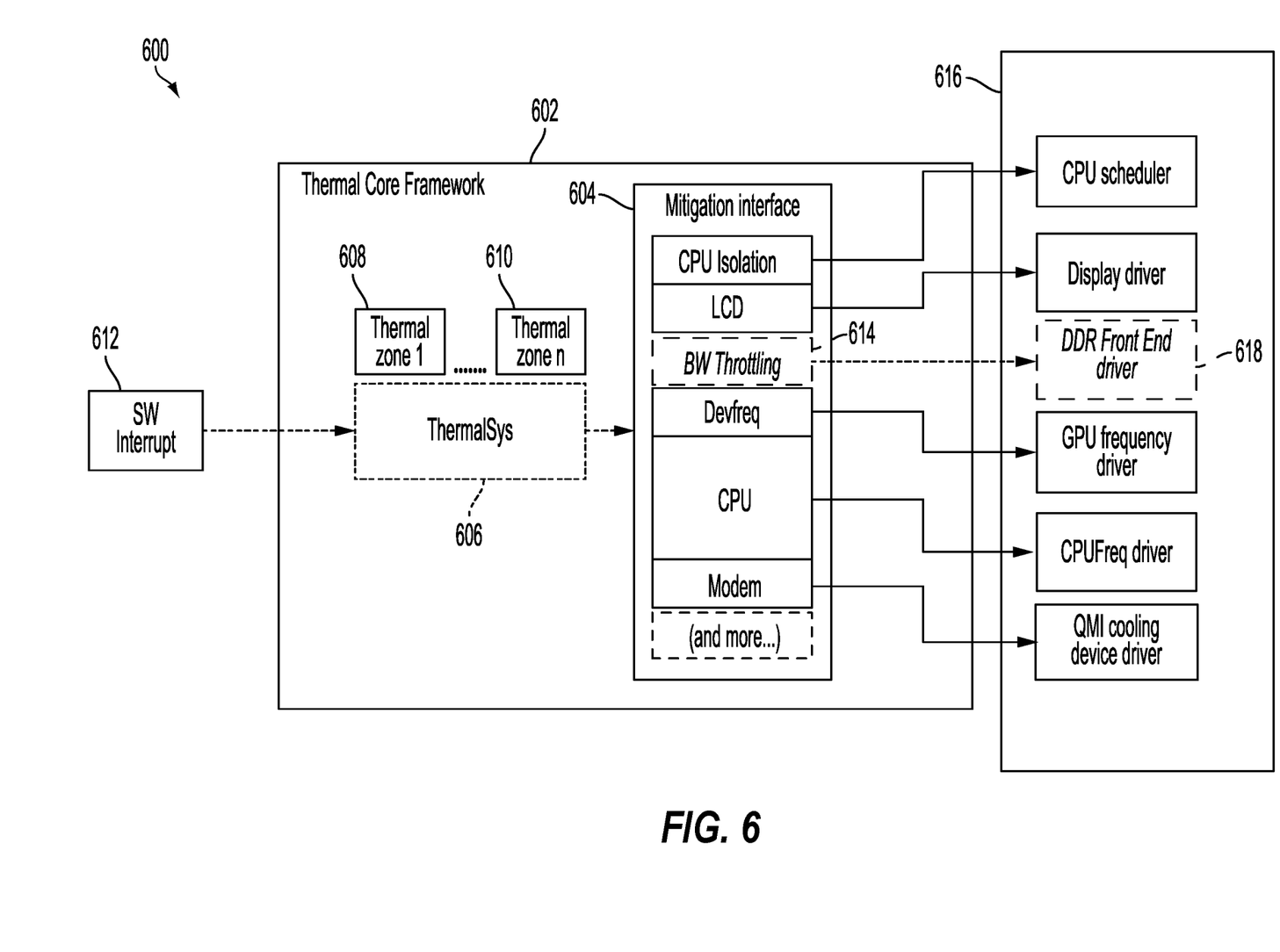
FIG. 6 is a block diagram of a thermal framework architecture, in accordance with various aspects of the present disclosure.

FIG. 6 is a block diagram of a thermal framework architecture 600, in accordance with aspects of the present disclosure. The thermal framework architecture 600 includes a thermal core framework 602 having a throttling mitigation interface 604 and a thermal system (thermalsys) 606 that operates with multiple thermal zones (zone 1 to zone n) 608, 610. The thermal system 606 is the center of the thermal core framework 602 and resides in the operating system kernel.

The thermal core framework 602 exposes each thermal sensor (e.g., TSENS 204, as seen in FIG. 2) as a thermal zone. That is, each thermal sensor operates in a thermal zone 608, 610. Each sensor may receive a trip threshold and notify the thermal core framework 602 of each trip violation. In alternative implementations, the thermal core framework 602 may poll for trip thresholds. Each thermal zone 608, 610 can be associated with one thermal governor. The thermal zones 608, 610 can have trip thresholds and each trip threshold may be associated with a cooling device 616 for a mitigation action.

Upon receiving a software interrupt 612, the thermal core framework 602 calls into a bandwidth throttling mitigation interface 614 of the mitigation interface 604. The software interrupt 612 triggers in response to detection of a rail limit. Mitigation actions are aggregated using cooling devices 616 that can be throttled to reduce temperature. A cooling device 616 is a device that can provide passive cooling when mitigated, for example, CPU frequency, GPU frequency, etc.

According to aspects of the present disclosure, the call into the bandwidth throttling mitigation interface 614 triggers a DDR front end driver 618 to throttle bandwidth at the DDR front end. It is noted that other mitigation interfaces may include modules for CPU isolation, liquid crystal display (LCD), device frequency (Devfreq), CPU, modem, and others. The mitigation interfaces communicate with respective cooling devices 616, such as a CPU scheduler, display driver, GPU frequency driver, CPU frequency driver, QMI cooling device driver, etc., to implement thermal mitigation. The cooling devices are logical software entities registered with the thermal manager. The cooling devices when invoked will trigger the core associated with it to reduce its operating performance level. For example, in the case of the LCD, the display driver can adjust its brightness, the CPU can reduce its clock frequency and in the case of bandwidth throttling, the DDR front end driver can throttle the bandwidth at the DDR front end.

Aspects of the present disclosure alternate mitigation schemes, such as thermal cooling device-based throttling, to manage peak power on the memory shared power rail, for example. Best effort clients, such as the GPU and NSP can flood a significant amount of traffic onto the DDR even with a low core clock. In some implementations, the GPU bandwidth is lowered, which will prevent the GPU from keeping the DDR and digital rail unnecessarily high. However, this will not prevent the GPU from attempting to saturate all bytes on the bus at the lower aggregated DDR frequency. In other words, throttling the core clock does not necessarily preclude or reduce the number of memory accesses by the subsystems, such as the GPU. Consequently, current contribution on MX rail from GPU can still be high.

For scenarios involving multiple best effort clients, throttling the core clock to a lowest level may not be sufficient to reduce the overall DDR load. In these cases, bandwidth limiting, in addition to core clock throttling, may be an efficient mitigation scheme. For example, register sets may be programmed with an absolute cap on DDR bandwidth from the GPU.

Figure 7:
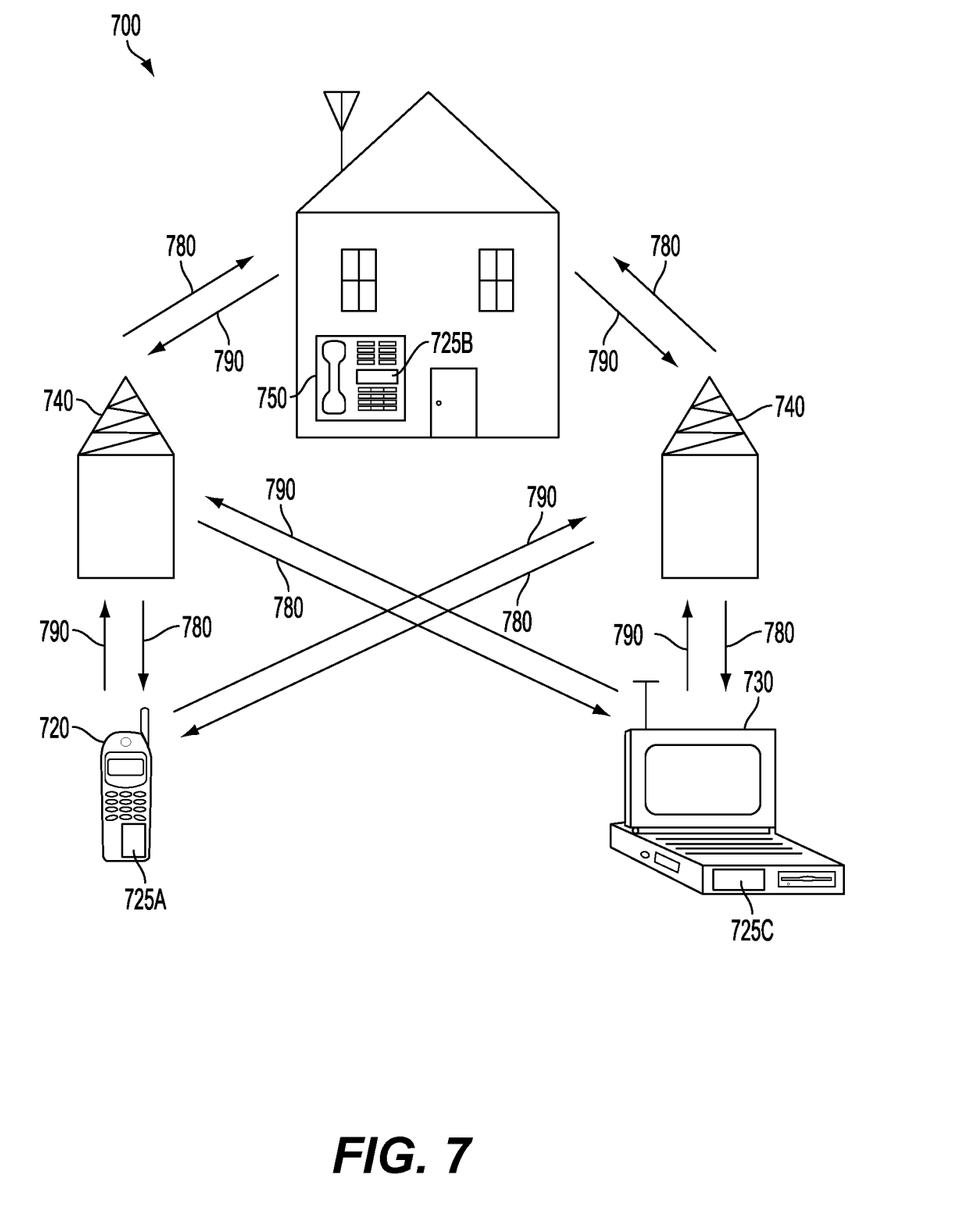
FIG. 7 is a block diagram showing an exemplary wireless communications system in which a configuration of the present disclosure may be advantageously employed.

FIG. 7 is a block diagram showing an exemplary wireless communications system 700, in which an aspect of the present disclosure may be advantageously employed. For purposes of illustration, FIG. 7 shows three remote units 720, 730, and 750, and two base stations 740. It will be recognized that wireless communications systems may have many more remote units and base stations. Remote units 720, 730, and 750 include integrated circuit (IC) devices 725A, 725B, and 725C that include the disclosed bandwidth cooling device. It will be recognized that other devices may also include the disclosed bandwidth cooling device, such as the base stations, switching devices, and network equipment. FIG. 7 shows forward link signals 780 from the base stations 740 to the remote units 720, 730, and 750, and reverse link signals 790 from the remote units 720, 730, and 750 to the base stations 740.

In FIG. 7, remote unit 720 is shown as a mobile telephone, remote unit 730 is shown as a portable computer, and remote unit 750 is shown as a fixed location remote unit in a wireless local loop system. For example, the remote units may be a mobile phone, a hand-held personal communication systems (PCS) unit, a portable data unit, such as a personal data assistant, a GPS enabled device, a navigation device, a set top box, a music player, a video player, an entertainment unit, a fixed location data unit, such as meter reading equipment, or other device that stores or retrieves data or computer instructions, or combinations thereof. Although FIG. 7 illustrates remote units according to the aspects of the present disclosure, the disclosure is not limited to these exemplary illustrated units. Aspects of the present disclosure may be suitably employed in many devices, which include the disclosed bandwidth cooling device.

Figure 8:
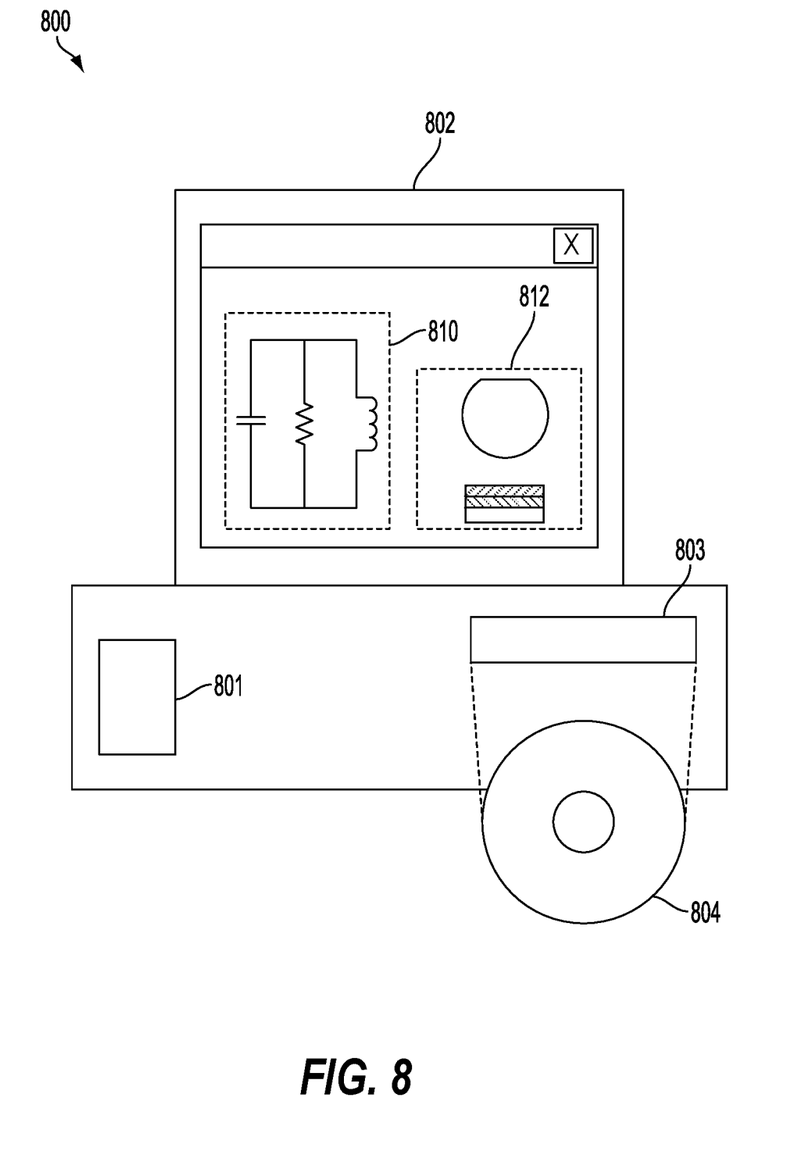
FIG. 8 is a block diagram illustrating a design workstation used for circuit, layout, and logic design of components, in accordance with various aspects of the present disclosure.

FIG. 8 is a block diagram illustrating a design workstation 800 used for circuit, layout, and logic design of a semiconductor component, such as the bandwidth cooling device disclosed above. The design workstation 800 includes a hard disk 801 containing operating system software, support files, and design software such as Cadence or OrCAD. The design workstation 800 also includes a display 802 to facilitate design of a circuit 810 or a semiconductor component 812, such as the bandwidth cooling device. A storage medium 804 is provided for tangibly storing the design of the circuit 810 or the semiconductor component 812 (e.g., the PLD). The design of the circuit 810 or the semiconductor component 812 may be stored on the storage medium 804 in a file format such as GDSII or GERBER. The storage medium 804 may be a CD-ROM, DVD, hard disk, flash memory, or other appropriate device. Furthermore, the design workstation 800 includes a drive apparatus 803 for accepting input from or writing output to the storage medium 804.

Data recorded on the storage medium 804 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 804 facilitates the design of the circuit 810 or the semiconductor component 812 by decreasing the number of processes for designing semiconductor wafers.

EXAMPLE ASPECTS

Aspect 1: A method of device cooling, comprising: determining whether an amount of power allocated to a plurality of devices drawing power from a shared power rail exceeds a power rail limit; and reducing device traffic to a specified bandwidth level for at least one of the plurality of devices in response to the amount of power allocated to the plurality of devices drawing power from the shared power rail exceeding the power rail limit.

Aspect 2: The method of Aspect 1, in which the device traffic comprises traffic from the at least one of the plurality of devices directed towards a memory device.

Aspect 3: The method of Aspect 1 or 2, in which the memory device comprises a double data rate (DDR) memory device.

Aspect 4: The method of any of the preceding Aspects, in which the at least one of the plurality of devices comprises a graphics processing unit (GPU).

Aspect 5: The method of any of the preceding Aspects, in which the amount of power is based on an aggregated peak current for each of the plurality of devices.

Aspect 6: The method of any of the preceding Aspects, in which the specified bandwidth level comprises one of a plurality of bandwidth levels, the specified bandwidth level selected based on how much the amount of power exceeds the power rail limit.

Aspect 7: The method of any of the preceding Aspects, in which reducing the device traffic comprises reducing current for the at least one of the plurality of devices by a quantity corresponding to the specified bandwidth level.

Aspect 8: An apparatus for device cooling, comprising: a memory; and at least one processor coupled to the memory, the at least one processor configured: to determine whether an amount of power allocated to a plurality of devices drawing power from a shared power rail exceeds a power rail limit; and to reduce device traffic to a specified bandwidth level for at least one of the plurality of devices in response to the amount of power allocated to the plurality of devices drawing power from the shared power rail exceeding the power rail limit.

Aspect 9: The apparatus for device cooling of Aspect 8, in which the device traffic comprises traffic from the at least one of the plurality of devices directed towards a memory device.

Aspect 10: The apparatus for device cooling of Aspect 8 or 9, in which the memory device comprises a double data rate (DDR) memory device.

Aspect 11: The apparatus for device cooling of any of the Aspects 8-10, in which the at least one of the plurality of devices comprises a graphics processing unit (GPU).

Aspect 12: The apparatus for device cooling of any of the Aspects 8-11, in which the amount of power is based on an aggregated peak current for each of the plurality of devices.

Aspect 13: The apparatus for device cooling of any of the Aspects 8-12, in which the specified bandwidth level comprises one of a plurality of bandwidth levels, the specified bandwidth level selected based on how much the amount of power exceeds the power rail limit.

Aspect 14: The apparatus for device cooling of any of the Aspects 8-13, in which the at least one processor is further configured to reduce current for the at least one of the plurality of devices by a quantity corresponding to the specified bandwidth level.

Aspect 15: An apparatus for device cooling, comprising: means for determining whether an amount of power allocated to a plurality of devices drawing power from a shared power rail exceeds a power rail limit; and means for reducing device traffic to a specified bandwidth level for at least one of the plurality of devices in response to the amount of power allocated to the plurality of devices drawing power from the shared power rail exceeding the power rail limit.

Aspect 16: The apparatus for device cooling of Aspect 15, in which the device traffic comprises traffic from the at least one of the plurality of devices directed towards a memory device.

Aspect 17: The apparatus for device cooling of Aspect 15 or 16, in which the memory device comprises a double data rate (DDR) memory device.

Aspect 18: The apparatus for device cooling of any of the Aspects 15-17, in which the at least one of the plurality of devices comprises a graphics processing unit (GPU).

Aspect 19: The apparatus for device cooling of any of the Aspects 15-18, in which the amount of power is based on an aggregated peak current for each of the plurality of devices.

Aspect 20: The apparatus for device cooling of any of the Aspects 15-19, in which the specified bandwidth level comprises one of a plurality of bandwidth levels, the specified bandwidth level selected based on how much the amount of power exceeds the power rail limit.

Aspect 21: The apparatus for device cooling of any of the Aspects 15-20, in which the means for reducing the device traffic comprises means for reducing current for the at least one of the plurality of devices by a quantity corresponding to the specified bandwidth level.

Aspect 22: A non-transitory computer-readable medium having program code recorded thereon, the program code executed by a processor and comprising: program code to determine whether an amount of power allocated to a plurality of devices drawing power from a shared power rail exceeds a power rail limit; and program code to reduce device traffic to a specified bandwidth level for at least one of the plurality of devices in response to the amount of power allocated to the plurality of devices drawing power from the shared power rail exceeding the power rail limit.

Aspect 23: The non-transitory computer-readable medium of Aspect 22, in which the device traffic comprises traffic from the at least one of the plurality of devices directed towards a memory device.

Aspect 24: The non-transitory computer-readable medium of Aspect 22 or 23, in which the memory device comprises a double data rate (DDR) memory device.

Aspect 25: The non-transitory computer-readable medium of any of the Aspects 22-24, in which the at least one of the plurality of devices comprises a graphics processing unit (GPU).

Aspect 26: The non-transitory computer-readable medium of any of the Aspects 22-25, in which the amount of power is based on an aggregated peak current for each of the plurality of devices.

Aspect 27: The non-transitory computer-readable medium of any of the Aspects 22-26, in which the specified bandwidth level comprises one of a plurality of bandwidth levels, the specified bandwidth level selected based on how much the amount of power exceeds the power rail limit.

Aspect 28: The non-transitory computer-readable medium of any of the Aspects 22-27, in which the program code further comprises program code to reduce current for the at least one of the plurality of devices by a quantity corresponding to the specified bandwidth level.

For a firmware and/or software implementation, the methodologies may be implemented with modules (e.g., procedures, functions, and so on) that perform the functions described. A machine-readable medium tangibly embodying instructions may be used in implementing the methodologies described. For example, software codes may be stored in a memory and executed by a processor unit. Memory may be implemented within the processor unit or external to the processor unit. As used, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present disclosure is not intended to be limited to the particular configurations of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the present disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in RAM, flash memory, ROM, erasable programmable read-only memory (EPROM), EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the present disclosure is provided to enable any person skilled in the art to make or use the present disclosure. Various modifications to the disclosure will be readily apparent to those skilled in the art, and the generic principles defined may be applied to other variations without departing from the spirit or scope of the disclosure. Thus, the present disclosure is not intended to be limited to the examples and designs described, but is to be accorded the widest scope consistent with the principles and novel features disclosed.

What is claimed is:

1. A method of device cooling, comprising:
   determining whether an amount of power allocated to a plurality of client devices drawing power from a shared memory power rail exceeds a memory power rail limit, each of the plurality of client devices directing traffic towards a memory device; and
   reducing device traffic to a target bandwidth level for at least one of the plurality of client devices in response to the amount of power allocated to the plurality of client devices drawing power from the shared memory power rail exceeding the memory power rail limit, the target bandwidth level based on a pre-silicon characterization that associates a bandwidth reduction amount with a power reduction amount.

2. The method of claim 1, in which the memory device comprises a double data rate (DDR) memory device.

3. The method of claim 1, in which the at least one of the plurality of client devices comprises a graphics processing unit (GPU).

4. The method of claim 1, in which the amount of power is based on an aggregated peak current for each of the plurality of client devices.

5. The method of claim 1, in which the target bandwidth level comprises one of a plurality of bandwidth levels, the target bandwidth level selected based on how much the amount of power exceeds the memory power rail limit.

6. The method of claim 1, in which reducing the device traffic comprises reducing current for the at least one of the plurality of client devices by a quantity corresponding to the target bandwidth level.

7. An apparatus for device cooling, comprising:
   a memory; and
   at least one processor coupled to the memory, the at least one processor configured:
      to determine whether an amount of power allocated to a plurality of client devices drawing power from a shared memory power rail exceeds a memory power rail limit, each of the plurality of client devices directing traffic towards a memory device; and
      to reduce device traffic to a target bandwidth level for at least one of the plurality of client devices in response to the amount of power allocated to the plurality of client devices drawing power from the shared memory power rail exceeding the memory power rail limit, the target bandwidth level based on a pre-silicon characterization that associates a bandwidth reduction amount with a power reduction amount.

8. The apparatus for device cooling of claim 7, in which the memory device comprises a double data rate (DDR) memory device.

9. The apparatus for device cooling of claim 7, in which the at least one of the plurality of client devices comprises a graphics processing unit (GPU).

10. The apparatus for device cooling of claim 7, in which the amount of power is based on an aggregated peak current for each of the plurality of client devices.

11. The apparatus for device cooling of claim 7, in which the target bandwidth level comprises one of a plurality of bandwidth levels, the target bandwidth level selected based on how much the amount of power exceeds the memory power rail limit.

12. The apparatus for device cooling of claim 7, in which the at least one processor is further configured to reduce current for the at least one of the plurality of client devices by a quantity corresponding to the target bandwidth level.

13. An apparatus for device cooling, comprising:
    means for determining whether an amount of power allocated to a plurality of client devices drawing power from a shared memory power rail exceeds a memory power rail limit, each of the plurality of client devices directing traffic towards a memory device; and
    means for reducing device traffic to a target bandwidth level for at least one of the plurality of client devices in response to the amount of power allocated to the plurality of client devices drawing power from the shared memory power rail exceeding the memory power rail limit, the target bandwidth level based on a pre-silicon characterization that associates a bandwidth reduction amount with a power reduction amount.

14. The apparatus for device cooling of claim 13, in which the memory device comprises a double data rate (DDR) memory device.

15. The apparatus for device cooling of claim 13, in which the at least one of the plurality of client devices comprises a graphics processing unit (GPU).

16. The apparatus for device cooling of claim 13, in which the amount of power is based on an aggregated peak current for each of the plurality of client devices.

17. The apparatus for device cooling of claim 13, in which the target bandwidth level comprises one of a plurality of bandwidth levels, the target bandwidth level selected based on how much the amount of power exceeds the memory power rail limit.

18. The apparatus for device cooling of claim 13, in which the means for reducing the device traffic comprises means for reducing current for the at least one of the plurality of client devices by a quantity corresponding to the target bandwidth level.

19. A non-transitory computer-readable medium having program code recorded thereon, the program code executed by a processor and comprising:

program code to determine whether an amount of power allocated to a plurality of client devices drawing power from a shared memory power rail exceeds a memory power rail limit, each of the plurality of client devices directing traffic towards a memory device; and program code to reduce device traffic to a target bandwidth level for at least one of the plurality of client devices in response to the amount of power allocated to the plurality of client devices drawing power from the shared memory power rail exceeding the memory power rail limit, the target bandwidth level based on a pre-silicon characterization that associates a bandwidth reduction amount with a power reduction amount.

20. The non-transitory computer-readable medium of claim 19, in which the memory device comprises a double data rate (DDR) memory device.

21. The non-transitory computer-readable medium of claim 19, in which the at least one of the plurality of client devices comprises a graphics processing unit (GPU).

22. The non-transitory computer-readable medium of claim 19, in which the amount of power is based on an aggregated peak current for each of the plurality of client devices.

23. The non-transitory computer-readable medium of claim 19, in which the target bandwidth level comprises one of a plurality of bandwidth levels, the target bandwidth level selected based on how much the amount of memory power exceeds the power rail limit.

24. The non-transitory computer-readable medium of claim 19, in which the program code further comprises program code to reduce current for the at least one of the plurality of client devices by a quantity corresponding to the target bandwidth level.

* * * * *